H. A. McDANIEL.
CLAMP FOR THE FRAMES OF EYEGLASSES.
APPLICATION FILED NOV. 27, 1908.
925,214.
Patented June 15, 1909
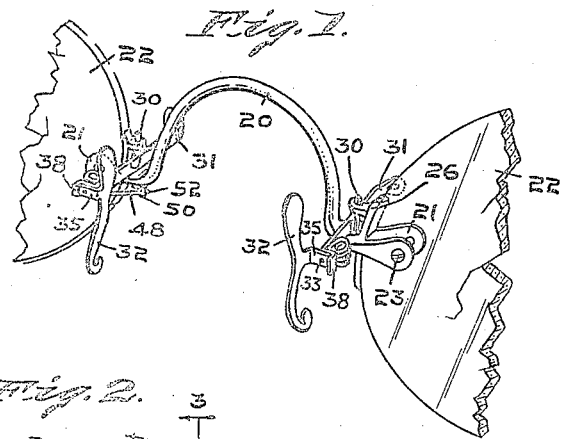
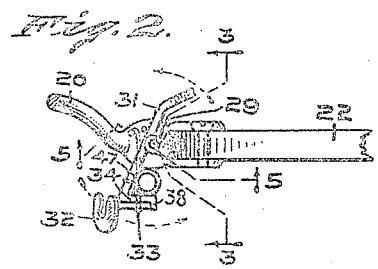
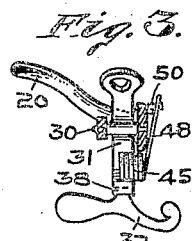
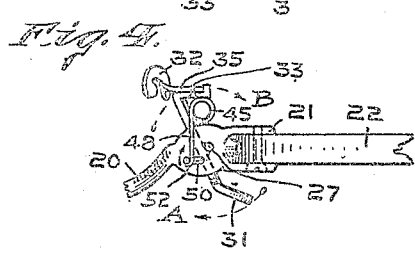
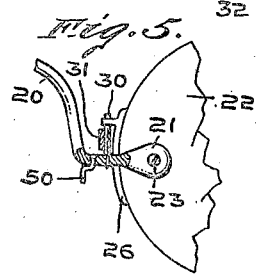
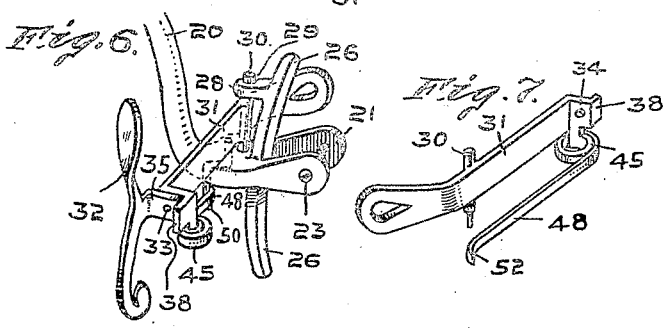
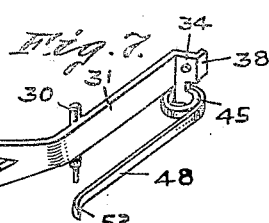
WITNESSES:
L. B. Woerner
E. E. Miller
INVENTOR
Harry A. McDaniel,
By Minturn & Woerner
ATT'YS

UNITED STATES PATENT OFFICE.

HARRY A. McDANIEL, OF LEBANON, INDIANA.

CLAMP FOR THE FRAMES OF EYEGLASSES.

No. 925,214.  Specification of Letters Patent.  Patented June 15, 1909.

Application filed November 27, 1908. Serial No. 464,736.

*To all whom it may concern:*

Be it known that I, HARRY A. MCDANIEL, a citizen of the United States, residing at Lebanon, in the county of Boone and State of Indiana, have invented certain new and useful Improvements in Clamps for the Frames of Eyeglasses, of which the following is a specification.

This invention relates to a clamping device for the frames of eye glasses; and the object of the invention is to provide clamping devices of the above character which are constructed to prevent loss of the tension of the springs, for holding the guards in position upon the frame, by the elimination of the frictional contact points.

A further object of the invention is the provision of clamping devices which will be neat in appearance, so as not to mar the appearance of the eye glass frame, which must necessarily be a delicate structure, and will require but little space for installation upon said frames and thereby eliminates the necessity for reducing the length of the arches of said frames.

I attain the several objects of the invention by means of the frame and clamping devices illustrated in the accompanying drawings, forming a part hereof, in which—
Figure 1 is a fragmentary detail perspective view of an eye glass frame showing the clamping devices in operating position. Fig. 2 is a fragmentary detail plan view of one of said clamping devices. Fig. 3 is a cross section on the line 3—3 in Fig. 2. Fig. 4 is an underside plan view of the construction shown in Fig. 2. Fig. 5 is a fragmentary detail view on the dotted line 5—5 in Fig. 2. Fig. 6 is a detail perspective view of a modified construction of the combined pivot-lever and spring. Fig. 7 is a perspective view of the combined pivot-lever and spring disconnected from the main frame.

In the drawings, 20 constitutes the arched portion of the frame which extends across the bridge of the nose, and the ends of said arch terminate in the usual and well known horizontally disposed flat portions which are bifurcated to form the ears 21, adapted to receive the lenses 22; these lenses being secured within said ears by means of the clamping screws 23. Integrally formed at the root of the ears 21 are the extensions 26 which bear against the adjacent edge of the lenses and are adapted to form a stationary brace for the latter. The horizontally disposed portions of the arch 20 are provided with the apertures 27 (see Fig. 4) and the upper ends of the extensions 26 are provided with the lugs 28, having recesses 29 which stand in vertical alinement with the apertures 27. Inserted in the apertures 27 and the recesses 29 are the pivot-pins 30, which carry the horizontally extending guard levers 31. By this construction the guard levers 31, springs 45 and guards 32 may be detached from the frame. These guard levers form a bearing for the nose guards or clamps 32, which are pivotally connected to the levers 31 at 33, thereby permitting them to automatically seat themselves against the sides of the nose when the eyeglasses are placed into position. The inner ends of the guard levers 31 have right angle bends 34 to form seats for the guards 32 by means of the integrally formed ears 35. The guard levers 31 have a second right angle bend 38, which stands in a plane parallel to that of the main bodies of said levers 31. These bends form stops for the rear ends of the ears 35, whereby the guards 32 are prevented from dropping into a horizontal position.

The forward ends of the guard levers 31 form handles whereby the levers may be pressed toward each other, thus moving the opposite ends, carrying the guards 32, in a reverse direction, causing said levers to be spread apart to permit the eyeglasses to be placed into position upon the nose. As the ends of the guard levers 31 are released, the opposite ends of said levers, carrying the guards 32, are forced toward each other, under the action of the springs 45. The springs 45 are provided with coils which add elasticity. The springs are mounted adjacent to the outer surfaces of the guard levers 31 and immediately in the rear of the right angle bent portions 34. The free ends 47 of the springs, immediately above the coils, will be suitably attached to the guard levers 31 and the ends 48 of the springs will project forward and make contact with the ends of the pivots 50.

As before stated, when the forward ends of the guard levers 31 are pressed toward each other the opposite ends of said levers are separated and in moving travel through an arc caused by the pivotal mounting of said levers. This travel of the guard levers causes a slight change in position of the projecting ends 48 of the springs 45 relative to the contact posts by means of which the springs are compressed, and in case these posts are stationary friction will result. The friction eventually interferes with the movement of the levers 31, and is of common occurrence in like devices of other manufacture. To eliminate this friction is the chief object of this invention and this is accomplished by providing movable contact posts for the projecting ends 48 of the springs which will move with the springs when the guard levers 31 are actuated. These movable contact posts are secured by means of the pivots 50 mounted in the horizontal portions of the arch 20 and to one side of the pivots 27 upon which the guard levers 31 are mounted. The pivots 50 comprise small crank shaped wires extending downwardly from the lower sides of the horizontal portions of the arch 20 to secure a swinging movement of the contact points between these pivots 50 and the projecting ends 48 of the springs. The pivots 50 are bent as shown in Fig. 5 of the drawings. Examining Fig. 4 of the drawings, which is an under side plan view, it will be noted that moving the outer end of the guard lever 31 in the direction of the arrow toward A, will cause the opposite end of said lever, carrying the guard 32, to travel in the opposite direction, indicated by the arrow toward B. If the projecting end 48 of the spring were to drag through a fixed guide on the frame, to compensate for the swinging movement of the guard levers 31, friction would result. Friction is eliminated by forming the hooks 52 on the ends 48 of the springs 45, which hooks engage the crank portions of the pivots 50 to prevent separation of the parts when the guard levers 31 are moved.

Figs. 6 and 7 are views of a modified construction in which the lever 31 and the actuating spring 45 are formed out of a single piece of material, and by means of which the same result, as above mentioned, is obtainable.

Having thus fully described my said invention, what I desire to secure by Letters Patent of the United States, is—

1. In an eyeglass, the frame a pair of guard levers pivotally mounted thereon, springs adapted to apply tension to said levers, and movable pivots on said frame adapted to form bearings for the free ends of said springs.

2. In an eyeglass, the frame a pair of guard levers pivotally mounted thereon, springs adapted to apply tension to said levers, movable pivots on said frame adapted to form bearings for the free ends of said springs, and means to prevent accidental separation of the springs and pivots.

3. In an eyeglass, the frame, a pair of guard levers pivotally mounted on said frame, guards pivotally mounted on said levers, stop-means on said levers to limit the movement of said guards, springs adapted to apply tension to said levers, and movable pivots on said frame adapted to form bearings for the free ends of said springs.

4. In an eyeglass, the frame, a pair of guard levers pivotally mounted on said frame, springs adapted to apply tension to said levers, and movable crank-shaped pivots on said frame adapted to form bearings for the free ends of said springs.

5. In an eyeglass, the frame, a pair of guard levers pivotally mounted on said frame, means for detachably mounting said levers on said frame, springs adapted to apply tension to said levers, and movable pivots on said frame adapted to form bearings for the free ends of said springs.

In witness whereof, I have hereunto set my hand and seal at Indianapolis, Indiana, this, 21st day of November, A. D. one thousand nine hundred and eight.

HARRY A. McDANIEL. [L. S.]

Witnesses:
F. W. WOERNER,
L. B. WOERNER.